United States Patent
Hintze-Brüning et al.

(10) Patent No.: US 9,556,339 B2
(45) Date of Patent: Jan. 31, 2017

(54) METHOD FOR PRODUCING AN ANTICORROSION COATING

(71) Applicants: BASF Coatings GmbH, Münster (DE); Université Blaise Pascal - Clermont II, Clermont-Ferrand (FR)

(72) Inventors: Horst Hintze-Brüning, Münster (DE); Jan-Bernd Kues, Münster (DE); Sebastian Sinnwell, Düsseldorf (DE); Kristof Wapner, Düsseldorf (DE); Fabrice Leroux, Le Cendre (FR); Thomas Stimpfling, Clermont Ferrand (FR)

(73) Assignees: BASF Coatings GmbH, Muenster (DE); UNIVERSITE BLAISE PASCAL—Clermont II, Clermont-Ferrand (FR)

(*) Notice: Subject to any disclaimer, the term of this patent is extended or adjusted under 35 U.S.C. 154(b) by 70 days.

(21) Appl. No.: 14/351,475

(22) PCT Filed: Oct. 19, 2012

(86) PCT No.: PCT/EP2012/004382
§ 371 (c)(1),
(2) Date: Apr. 11, 2014

(87) PCT Pub. No.: WO2013/056846
PCT Pub. Date: Apr. 25, 2013

(65) Prior Publication Data
US 2014/0302334 A1    Oct. 9, 2014

Related U.S. Application Data

(60) Provisional application No. 61/548,762, filed on Oct. 19, 2011.

(30) Foreign Application Priority Data

Oct. 19, 2011 (EP) .................... 11185839

(51) Int. Cl.
*C09D 5/08* (2006.01)
*C23F 11/00* (2006.01)
(Continued)

(52) U.S. Cl.
CPC . *C09D 5/08* (2013.01); *B05D 7/14* (2013.01); *B05D 7/16* (2013.01); *B05D 7/50* (2013.01); *C09D 4/00* (2013.01); *C09D 5/082* (2013.01); *C09D 5/086* (2013.01); *C09D 5/12* (2013.01); *C09D 15/00* (2013.01); *C23F 11/00* (2013.01);
(Continued)

(58) Field of Classification Search
None
See application file for complete search history.

(56) References Cited

U.S. PATENT DOCUMENTS 6,737,468 B1    5/2004  Bremser
2010/0167089 A1*  7/2010  Chouai .................. C09D 5/084
                                                        428/702
(Continued)

FOREIGN PATENT DOCUMENTS

DE           19930665        1/2001
DE      10-2007-054241       5/2009
(Continued)

OTHER PUBLICATIONS

PCT International Search Report in PCT/EP2012/004382, mailed Feb. 20, 2013, 3 pages.
(Continued)

*Primary Examiner* — Shamim Ahmed
*Assistant Examiner* — Bradford Gates
(74) *Attorney, Agent, or Firm* — Servilla Whitney LLC

(57) ABSTRACT

The present invention relates to a method for producing an anticorrosion coating, wherein
(1) an anticorrosion primer comprising
   (A) at least one organic resin as binder and
   (B) at least one synthetic layered double hydroxide comprising organic anions is applied directly to a metallic substrate and
(2) a polymer film is formed from the anticorrosion primer applied in stage (1), the method being characterized in that the at least one synthetic layered double hydroxide (B) comprises at least one organic anion of the following formula (I):

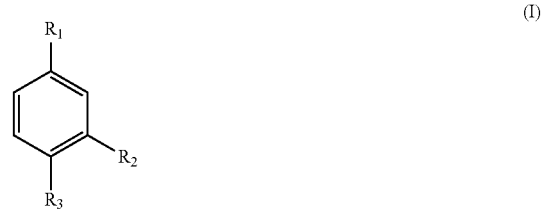

where $R_1$=COO$^-$, SO$_3^-$, $R_2$/$R_3$=NH$_2$, OH, H.

The present invention relates, furthermore, to coated metallic substrates coated by the method of the invention. The present invention relates not least to the use of the anticorrosion primer for use in the method of the invention for improving the corrosion resistance of metallic substrates.

15 Claims, No Drawings

(51) Int. Cl.
  *C09D 15/00*   (2006.01)
  *B05D 7/14*    (2006.01)
  *B05D 7/16*    (2006.01)
  *B05D 7/00*    (2006.01)
  *C09D 4/00*    (2006.01)
  *C09D 5/12*    (2006.01)
  *C08K 5/13*    (2006.01)
  *C08K 5/18*    (2006.01)
  *C08K 5/42*    (2006.01)
  *C08K 9/04*    (2006.01)

(52) U.S. Cl.
  CPC . *C08K 5/13* (2013.01); *C08K 5/18* (2013.01); *C08K 5/42* (2013.01); *C08K 9/04* (2013.01); *Y10T 428/31678* (2015.04)

(56) References Cited

U.S. PATENT DOCUMENTS

2010/0323114 A1* 12/2010 Hintze-Bruning . C08G 18/0823 427/402
2011/0045178 A1  2/2011  Hintze-Bruning et al.
2012/0264858 A1  10/2012 Hintze-Bruning et al.
2012/0269978 A1  10/2012 Hintze-Bruning et al.

FOREIGN PATENT DOCUMENTS

| DE | 10-2007-054249 | 5/2009 | |
| DE | 10-2009-021069 | 11/2010 | |
| DE | 10-2009-021070 | 11/2010 | |
| EP | 0282619 | 9/1988 | |
| FR | WO 2009062622 A1 * | 5/2009 | ......... C08G 18/0823 |
| WO | WO-03/102085 | 12/2003 | |
| WO | WO-2005/003408 | 1/2005 | |
| WO | WO-2009/062621 | 5/2009 | |

OTHER PUBLICATIONS

PCT International Preliminary Report on Patentability in PCT/EP2012/004382, mailed May 1, 2014, 8 pages.

* cited by examiner

METHOD FOR PRODUCING AN ANTICORROSION COATING

CROSS-REFERENCE TO RELATED APPLICATIONS

This application is the National Stage entry of PCT/EP2012/004382, filed on Oct. 19, 2012, which claims priority to European Application Number 11185839.5, filed on Oct. 19, 2011, and U.S. Provisional Application No. 61/548,762, filed on Oct. 19, 2011, which are incorporated herein by reference in their entireties.

FIELD

The present invention relates to a method for producing an anticorrosion coating, wherein an anticorrosion primer comprising an organic polymer as binder and a synthetic layered double hydroxide comprising organic anions is applied directly to a metallic substrate and subsequently a polymer film is formed from the applied anticorrosion primer. The present invention further relates to a coated metallic substrate coated by the stated method. The present invention likewise relates to the use of the anticorrosion primer for improving the corrosion resistance of metallic substrates.

BACKGROUND

The corrosion of metallic materials represents a problem which has today still not been satisfactorily solved. As a result of the corrosion, by which is meant the generally electrochemical reaction of a metallic material with its atmospheric surroundings, more particularly oxygen and water, there are significant alterations to the material. Corrosion damage leads to impairment of function in metallic components and ultimately to the need for the components to be repaired or replaced. The corresponding economic significance of corrosion, and of protection against corrosion, is therefore highly relevant.

It is for these reasons that great importance is accorded to corrosion control across virtually all sectors of the metal industry (examples being mechanical engineering and equipment, automotive industry (vehicle construction), aviation and aerospace industry, shipbuilding industry, electrical industry, precision mechanics industry), but especially in the sectors of the automotive and aviation industries. In the latter sectors in particular, metallic substrates are used very extensively as components, which are exposed to atmospheric conditions, in some cases to extreme atmospheric conditions.

In the finishing of vehicles and in the aviation industry, metallic substrates are typically subjected to an expensive and involved multicoat coating procedure. This is necessary in order to be able to meet the exacting requirements of the vehicle-making and aviation industries—which include effective corrosion control, for example.

Commonly first of all as part of the pretreatment of the metallic substrate, a conversion coating is constructed that protects against corrosion. Examples include the phosphatizing of steel substrates or chromating of aluminum substrates or aluminum alloys, examples being specialty aluminum-copper alloys such as the AA2024-T3 alloy. The latter finds application primarily in the aviation industry on account of its very good processing properties, its low density and at the same time resistant nature with respect to physical stressing. At the same time, however, the material has a propensity toward the hazardous filiform corrosion, where, often after physical damage to the substrate coating in conjunction with high atmospheric humidity, the corrosion propagates in filament form beneath the coating of the substrate and produces filiform corrosion damage to the metallic substrate. Effective corrosion control, accordingly, is important.

Following the pretreatment and the construction of appropriate conversion coats, in principle a primer coat is produced which provides protection from corrosion. This primer coat is based on an organic-polymeric matrix and may further comprise the anticorrosion pigments that are described later on below. In the context of the automotive industry, this primer coat generally constitutes an electrodeposition coating, more particularly a cathodic electrocoat. In the aircraft industry, special epoxy resin-based primers are usually employed. In the automotive finishing sector, what then follows, generally, is the production of a surfacer coating, whose function, for example, is to compensate any unevennesses still present in the substrate, and to protect the cathodic electrocoat from stonechip damage. In the last step, finally, the topcoat is applied, which particularly in the case of automotive finishing is composed of two separately applied coats, a basecoat and a clearcoat.

One effective form of corrosion protection of metallic substrates, and one which is also still used nowadays, is the use of chromates. Chromates are used, for example, in the construction of conversion coats as part of the surface pretreatment of metallic substrates (chromating). Frequently, likewise, chromates are used as anticorrosion pigments directly in anticorrosion primers based on organic-polymeric resins. These primers, therefore, are coating materials or paints which in addition to known film-forming components such as organic resins, as binder, further comprise certain chromates in the form of chromate salts (e.g., barium chromate, zinc chromate, strontium chromate).

The corrosion control effect of chromates, in the construction of conversion coats by the etching of the metallic surface (aluminum, for example) and the consequent proportional reduction of the chromate to form trivalent chromium, for example, and also the construction of low-solubility passivation coats of mixed aluminum(III)/chromium(III)/chromium(VI) oxide hydrates, has been known for a long time.

Problems, however, are presented by the high toxic and carcinogenic effect of the chromates, and the associated burden on people and the environment. Avoiding chromates in the vehicle industry while at the same time retaining appropriate protection from corrosion has therefore long been a desideratum within the corresponding branches of industry.

An example of one possible approach for avoiding chromates while at the same time retaining an appropriate protection from corrosion is the use of oxo anions (and/or salts thereof) of various transition metals, such as $MoO_4^{2-}$, $MnO_4^-$ and $VO_3^-$, for example. Also known is the use of lanthanoid cations or different organic species such as, for example, benzotriazoles, ethylenediaminetetraacetic acid (EDTA), quinoline derivatives or phosphate derivatives. The underlying mechanisms of action are complex and even now are still not fully understood. They range from the formation of passivating oxide/hydroxide coats on the corroding metal surface through to the complexation of certain metal cations (Cu(II), for example) and the associated suppression of specific forms of corrosion (an example being the filiform corrosion of aluminum-copper alloys).

A further approach lies in the use of so-called nanocontainer materials and/or layer structure materials such as, for example, organic cyclodextrins or inorganic materials such as zeolites, alumina nanotubes and smectites. Also in use are hydrotalcite components and layered double hydroxide materials. The latter are usually referred to in the general technical literature together with the corresponding abbreviations "LDH". In the literature they are frequently described by the idealized general formula $[M2^{2+}_{(1-x)}M3^{3+}_x(OH)_2]^{x+}[A^{y-}_{(x/y)}nH_2O]$ or similar empirical formulae. In these formulae, M2 stands for divalent metallic cations, M3 for trivalent metallic cations, and A for anions of valence x. In the case of the naturally occurring LDH these are generally inorganic anions such as carbonate, chloride, nitrate, hydroxide and/or bromide. Various further organic and inorganic anions may also be present more particularly in synthetic LDH, which are described later on below. The general formula above also accounts for the water of crystallization that is present. In the case of the hydrotalcites, the divalent cation is $Mg^{2+}$, the trivalent cation is $Al^{3+}$, and the anion is carbonate, although the latter may be substituted at least proportionally by hydroxide ions or other organic and also inorganic anions. This is true especially of the synthetic hydrotalcites. The hydrotalcites can therefore be identified as a special form of the layer structures known generally as LDH. The hydrotalcites and LDH have a layerlike structure similar to that of brucite $(Mg(OH)_2)$, in which between each pair of metal hydroxide layers, which are positively charged because of the trivalent metal cations proportionally present, there is a negatively charged layer of intercalated anions, this layer generally further containing water of crystallization. The system is therefore one of layers with alternating positive and negative charges, forming a layer structure by means of corresponding ionic interactions. In the formula shown above, the LDH layer structure is accounted for by the brackets placed accordingly.

Between two adjacent metal hydroxide layers it is possible for various agents to be intercalated, examples being the anticorrosion agents referred to above, by means of noncovalent, ionic and/or polar interactions. For instance, in the case of the hydrotalcites and LDH, anticorrosion agents in anionic form are intercalated into the anionic layers. They are incorporated directly into corresponding coating materials based on polymeric binders (primers, for example) and hence contribute to the corrosion control. In this case they support the conversion coats that provide protection against corrosion. Attempts are also being made to replace the conversion coats completely, in which case the corresponding primers are then applied directly to the metal. In this way, the coating procedure is made less involved and hence more cost-effective.

WO 03/102085 describes synthetic hydrotalcite components and layered double hydroxides (LDH) comprising exchangeable anions and the use thereof in coating materials for the purpose of improving the corrosion control on aluminum surfaces. The layered double hydroxides here are described by the idealized general formula $[M2^{2+}_{(1-x)}M3^{3+}_x(OH)_2]^{x+}[A^{x-}nH_2O]$ already indicated earlier on above. Preferred metal cations are the hydrotalcite cations magnesium(II) and aluminum(III). Anions described are, for example, nitrate, carbonate or molybdate, but also the chromium-containing anions chromate and dichromate, with the toxic, carcinogenic chromate exhibiting the best corrosion control.

Further hydrotalcite components and LDH and the use thereof as anticorrosion agents in coating materials based on organic polymeric binders are described in EP 0282619 A1, WO 2005/003408 A2 or ECS Transactions, 24 (1) 67-76 (2010), for example. In these cases, as well as the inorganic anions described already, there are also organic anions used, for example, such as salicylate, oxalate, DMTD (2,4-dimercapto-1,3,4-thiadiazole) and derivatives thereof, anions obtainable from EDTA, or benzotriazolate.

In spite of the approaches described above, the problem of corrosion has to date not been satisfactorily solved. A consequence of this is that, even now, it is still necessary to use chromium-containing compounds widely as anticorrosion agents in order to guarantee appropriate corrosion control.

WO 2009/062621 A1 likewise describes the use of LDH in coating materials for producing stonechip-resistant OEM coating systems in the automotive finishing field. As is known, such OEM coating systems are composed of an anticorrosion coating (more particularly cathodic electrocoat), a primer-surfacer coat, a basecoat, and a clearcoat to finish. The LDH are used in the primer-surfacer coat. This primer-surfacer coat is said to exhibit not only high stonechip resistance but also effective adhesion to the underlying cathodic electrocoat and to the basecoat lying on top, and, furthermore, good surfacing properties (masking the structure of the substrate). The use of LDH components as corrosion inhibitors is not described. Nor is there a description of application of the coating materials comprising LDH components directly to the substrate. Organic anions employed include, for example, m- or p-aminobenzenesulfonate, m- or p-hydroxybenzenesulfonate, m- or p-aminobenzoate and/or m- or p-hydroxybenzoate.

SUMMARY

Provided are methods of making an anticorrosion coating. Also provided are coated metallic substrates coated by the methods disclosed herein.

Problem Addressed by the Present Invention

In spite of the numerous approaches to producing coatings on metallic substrates with appropriate corrosion control effect while at the same time avoiding chromium-containing anticorrosion agents, the underlying problem has to date not been satisfactorily solved. As a consequence of this, a decisive part in the construction of corrosion control coatings on metallic substrates continues to be played by the chromium-containing anticorrosion agents. It looks extremely difficult to achieve appropriate corrosion control when, for example, attempts are made to do without corresponding conversion coats and to apply the primer in question directly to the metallic substrate, in order thereby to make the coating operation more cost-effective and less time-consuming.

The problem addressed by the present invention, accordingly, was to ensure effective corrosion control on metallic substrates while at the same time allowing chromium-containing anticorrosion agents to be done away with. Moreover, the intention was that the coating operation involved should be extremely simple. Hence the resulting coating ought to be based on as few as possible a number of different individual coats. It ought, moreover, to be possible to do without corresponding conversion coats while nevertheless obtaining excellent corrosion control. In this way it ought more particularly to be possible, in the fields of the automotive industry (vehicle construction) and of the aviation industry, which are challenging in terms of corrosion control, to combine the advantages of effective corrosion control with an economically advantageous coating operation.

DETAILED DESCRIPTION

Solution Provided by the Invention

In accordance with the invention it has been possible to solve the problems by means of a method for producing an anticorrosion coating, wherein
(1) an anticorrosion primer comprising
  (A) at least one organic polymer as binder and
  (B) at least one synthetic layered double hydroxide comprising organic anions
is applied directly to a metallic substrate and
(2) a polymer film is formed from the anticorrosion primer applied in stage (1),
the method being characterized in that
the at least one synthetic layered double hydroxide (B) comprises at least one organic anion of the following formula (I):

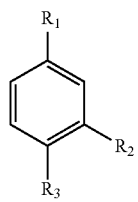
(I)

where
$R_1$=COO$^-$, SO$_3^-$,
$R_2/R_3$=NH$_2$, OH, H.

The present invention further provides a coated metallic substrate coated by the said method.

The present invention likewise relates to the use of the anticorrosion primer and hence of the synthetic LDH present therein, comprising organic anions, for improving the corrosion resistance of metallic substrates.

The method of the invention ensures excellent corrosion control on metallic substrates, and also allows chromium-containing anticorrosion agents to be done away with. At the same time it is possible to do without conversion coats and yet to obtain excellent corrosion control. The advantages of effective corrosion control are combined, therefore, with an economically advantageous coating operation. The method can therefore be employed in the fields of the automotive industry (vehicle construction), and of the aviation industry, which are demanding in terms of corrosion control.

DETAILED DESCRIPTION OF THE INVENTION

The anticorrosion primer for use in the method of the invention comprises as binder at least one organic polymer (A) as described later on below. As is known, the term "binders" is used for organic compounds in coating materials that are responsible for film formation. They constitute the nonvolatile fraction of the coating material, without pigments and fillers. From the anticorrosion primer, therefore, following application to a substrate, a polymer film is formed, so that the coating film formed is based on an organic polymer matrix.

The anticorrosion primer for use in the method of the invention is curable physically, thermally or actinically, for example. For this purpose it then comprises as binder at least one organic polymer (A), as described later on below, which is curable physically, thermally or with actinic radiation, for example. The anticorrosion primer is preferably curable physically or thermally. Where it is thermally curable, for example, the anticorrosion primer may be self-crosslinking and/or externally crosslinking. It is preferably externally crosslinking. The anticorrosion primer to be used may also be curable thermally and actinically. This means, for example, that the organic polymer (A) is curable both thermally and actinically. In that case it is of course also possible for both curing methods to be employed simultaneously or in succession—that is, dual-cure curing.

In the context of the present invention, "physically curable" or the term "physical curing" denotes the formation of a film by loss of solvent from polymer solutions or polymer dispersions.

In the context of the present invention, "thermally curable" or the term "thermal curing" denotes the crosslinking of a layer of coating material (formation of a coating film) that is initiated by chemical reaction of reactive functional groups, the energetic activation of this chemical reaction being possible through thermal energy. In this context it is possible for different functional groups which are complementary to one another to react with one another (complementary functional groups), and/or film formation is based on the reaction of autoreactive groups, in other words functional groups which react between one another with groups of their own kind. Examples of suitable complementary reactive functional groups and autoreactive functional groups are known from, for example, German patent application DE 199 30 665 A1, page 7, line 28, to page 9, line 24.

This crosslinking may be self-crosslinking and/or external crosslinking. Where, for example, the complementary reactive functional groups are already present in the organic polymers (A) used as binders, the system is self-crosslinking. External crosslinking exists, for example, if an organic polymer (A) comprising certain functional groups reacts with a crosslinking agent as described later on below, the crosslinking agent then containing reactive functional groups which are complementary to the reactive functional groups present in the organic polymer (A) that is used.

It is also possible for an organic polymer (A) as binder to have both self-crosslinking functional groups and externally crosslinking functional groups, and then to be combined with crosslinking agents.

In the context of the present invention, "actinically curable" or the term "actinic curing" refers to the fact that the curing is possible on application of actinic radiation, this being electromagnetic radiation such as near infrared (NIR) and UV radiation, more particularly UV radiation, and also particulate radiation such as electron beams for the curing. Curing by UV radiation is typically initiated by free-radical or cationic photoinitiators. Typical actinically curable functional groups are carbon-carbon double bonds, in which case, generally, free-radical photoinitiators are employed. Systems containing epoxide groups as well can be cured actinically, in which case the curing is initiated generally by cationic photoinitiators and the epoxide groups thus activated can be reacted with the typical crosslinking agents for sytems containing epoxide groups, which are also described later on below. Actinic curing, therefore, is likewise based on a chemical crosslinking, with the energetic activation of this chemical reaction being brought about by means of actinic radiation.

The first constituent of the anticorrosion primer to be used as part of the method of the invention is at least one organic polymer (A) as binder. As is known, organic polymers are mixtures of molecules of different sizes, these molecules being distinguished by a sequence of identical or different organic monomer units (as a reacted form of organic monomers). Therefore, whereas a defined organic monomer can be assigned a discrete molecular mass, a polymer is always a mixture of molecules which differ in their molecular mass. A polymer, therefore, cannot be described by a discrete molecular mass, but is instead, as is known, always assigned average molecular masses, namely a number-average ($M_n$) and a weight-average ($M_w$) molecular mass. As is known, the described properties must by definition always lead to the relation $M_w$ greater than $M_n$; i.e., the polydispersity ($M_w/M_n$) is always greater than 1. The resins in question, therefore, are, for example, the conventional polyaddition resins, polycondensation resins and/or addition polymerization resins. Examples include polyvinylacetal resins, acrylic resins, epoxy resins, polyurethane resins, polyesters, polyamide resins and polyether resins. The polymers may comprise, for example, the aforementioned functional groups for complementary and/or autoreactive crosslinking.

The fraction of the at least one organic polymer (A) as binder in the anticorrosion primer is preferably 20% to 90% by weight, more preferably 30% to 70% by weight and with more particular preference 40% to 60% by weight, based in each case on the solids of the anticorrosion primer.

For the determination of the solids in the context of the present invention an amount of 1 g of the constituent in question, such as a dispersion of a polymer in corresponding solvents, for example, or of the entire anticorrosion primer, is heated at 125° C. for 1 hour, cooled to room temperature and then reweighed.

In the case of a thermally curable, externally crosslinking anticorrosion primer, a crosslinking agent is generally used in addition to the above-described polymers (A) as binders. The crosslinking agents are, for example, the polyamines known to the skilled person and described later on below, or else blocked and/or free polyisocyanates such as, for example, hexamethylene diisocyanate, isophorone diisocyanate, their isocyanurate trimers, and also partially or fully alkylated melamine resins.

The selection and combination of suitable organic polymers (A) as binders and optionally crosslinking agents are made in accordance with the desired and/or required properties of the coating system to be produced. Another criterion for selection are the desired and/or required curing conditions, more particularly the curing temperatures. The person skilled in the art is familiar with how such selection should be made, and is able to adapt it accordingly. It is of advantage, however, if no anionically stabilized polymers are used as organic polymers (A). Anionically stabilized polymers are known to be polymers modified with anionic groups and/or with functional groups which can be converted by neutralizing agents into anions (examples being carboxylate groups and/or carboxylic acid groups) and so can be dispersed in water. Such polymers can then be used in aqueous compositions, as for example in aqueous coating compositions. In the context of the present invention it has emerged that the use of such anionically stabilized polymers (A) may be disadvantageous, since it may possibly result in exchange of a proportion of the organic anions present in the LDH described later on below for the polymer molecules. Preferably, therefore, the anticorrosion primer of the invention is free from anionically stabilized polymers.

Possible systems here are the conventional one-component (1C) and multicomponent systems, more particularly two-component (2C) systems.

In one-component (1C) systems the components to be crosslinked—for example, the organic polymers (A) as binders and the crosslinking agents—are present alongside one another, namely in one component. A prerequisite for this is that the components to be crosslinked crosslink with one another only at relatively high temperatures and/or on exposure to actinic radiation.

In two-component (2C) systems the components to be crosslinked—for example, the organic polymers (A) as binders and the crosslinking agents—are present separately from one another in at least two components, which are not combined until shortly before application. This form is selected when the components to be crosslinked react with one another even at room temperature. (2C) Systems are preferred.

The anticorrosion primer preferably comprises at least one polyvinylbutyral resin and/or epoxy resin as organic polymer (A); at least one epoxy resin is especially preferred.

Polyvinylbutyrals, or polyvinylbutyral resin, are known to be terms used for polymers prepared from polyvinyl alcohols by acetalization with butanal. They therefore belong to the group of the polyvinylacetals. The polyvinyl alcohols that are needed for the preparation of the polyvinylbutyrals are prepared by radial polymerization of vinyl acetate to form polyvinyl acetate, and by subsequent alkaline hydrolysis. The actual subsequent preparation of the polyvinylbutyrals takes place in general through the reaction of the polyvinyl alcohols with butanal in the presence of acidic catalysts. In this reaction, statistical and steric reasons dictate a maximum attainable functionalization of around 80%. Since, as described above, the polyvinyl alcohols to be used for preparing the polyvinylbutyrals are prepared fundamentally by hydrolysis of polyvinyl acetate and since in that reaction as well no a complete conversion is anticipated, the polyvinylbutyrals generally comprise at least a small fraction of acetyl groups (at least about 2%). The polyvinylbutyrals are used preferably as solutions or dispersions in organic solvents such as, for example, alcohols, ethers, esters, ketones or chlorinated hydrocarbons or mixtures thereof in the anticorrosion primer of the invention. The resins may be used as sole binder in physically curing anticorrosion primers, for example, or in combination with, for example, phenol groups or hydroxyl groups) or the fraction of (unhydrolyzed amino resins. Characteristics of the polyvinylbutyrals are, for example, the fraction of acetal groups (or the residual fraction of free, unreacted) acetyl groups in the polymer.

Ultimately, in the context of the present invention, all of the polyvinylbutyrals known per se to the skilled person may be used. It is preferred, however, to use polyvinylbutyrals having a degree of acetalization of between 20% and 60%, more preferably having a degree of acetalization of between 30% and 45% (measured, for example, in accordance with the COST standard: COST 9439 RU). Polyvinylbutyrals of this kind may be obtained, for example, under the trade name Mowital from the company Kurary, under the trade name Pioloform from the company Wacker or under the trade name Butvar from the company Butvar.

In the case of the likewise preferred epoxy resins as organic polymers (A) in the anticorrosion primer of the invention, the resins in question are the conventional polycondensation resins which in the base molecule comprise more than one epoxide group. The resins in question are preferably epoxy resins prepared by condensation of bisphenol A or bisphenol F with epichlorohydrin. These compounds contain hydroxyl groups along the chain and epoxide groups at the ends. The capacity of the epoxy resins for crosslinking by the epoxide groups or by the hydroxyl groups changes according to their chain length. While the capacity for crosslinking by the epoxide groups falls as the chain length and molar mass go up, the crosslinking capacity by the hydroxyl groups rises as the chain length grows. In the context of the present invention it is possible, ultimately, to use all of the epoxy resins known per se to the skilled person, examples being the epoxy resins specified later on below and available commercially, which may be obtained as a solution or dispersion in organic solvents or water. For the reasons already given above, however, it is advantageous not to use anionically stabilized epoxy resins.

The epoxy resins whose use is preferred in the context of the present invention preferably have an epoxide group content of 800 to 7000 mmol of epoxide groups per kg of resin (mmol/kg), with more particular preference of 3500 to 6000 mmol/kg. This amount of epoxide groups per kg of resin is determined, in the context of the present invention, in accordance with DIN EN ISO 3001.

Epoxy resins of this kind may be obtained, in the form for example of a solution or dispersion in organic solvents or water, under the trade name Beckopox from the company Cytec or under the trade name Epikote from the company Momentive, for example.

Since the epoxy resins generally do not have film-forming properties on their own, corresponding epoxy resin crosslinking agents are used additionally when such resins are employed. With more particular preference, in the context of the present invention, the polyamines already identified above are used as crosslinking agents or epoxy resin crosslinking agents. As is known, "polyamines" is a collective designation for organic compounds having 2 or more amino groups, examples being diamines or triamines. Besides the amino groups, the compounds in this case, for example, have an aliphatic or aromatic parent structure—that is, they consist, for example, of amino groups and aliphatic groups or amino groups and aromatic groups (aliphatic or aromatic polyamines). The polyamines may of course also contain aliphatic and aromatic units and also, optionally, further functional groups. Examples of aliphatic polyamines are diethylenetriamine, triethylenetetramine, 3,3',5-trimethylhexamethylenediamine, 1,2-cyclohexyldiamine and isophoronediamine. Examples of aromatic amines are methylenedianiline and 4,4-diaminodiphenyl sulfone. The generic term "polyamines" likewise embraces organic compounds which are prepared, for example, from an aliphatic or aromatic polyamine as described above (as so-called base polyamine) by reaction of at least some of its amino groups with other organic compounds, in order thereby to influence various properties such as the reactivity and/or the solubility of the compounds and/or else to exert influence over the properties of the coating produced from the coating composition in question (surface hardness, for example). Such compounds, then, constitute adducts and, where they still contain at least 2 amino groups, may be designated as polyamine adducts or modified polyamines. They of course also have a higher molecular weight than the aforementioned polyamines, and so their detrimental effect on health is reduced. Such polyamine adducts frequently constitute reaction products of aliphatic and/or aromatic polyamines with polyepoxides, examples being the epoxy resins described above, or else with discrete difunctional compounds such as bisphenol A diglycidyl ether, in which case a stoichiometric excess of amino groups is used in comparison to the epoxide groups. These adducts are then used for curing the epoxy resins in the actual coating composition. One known example is the reaction product of 3,3',5-trimethylhexamethylenediamine as base polyamine with bisphenol A diglycidyl ether as epoxy resin. Likewise embraced by the generic term "polyamines", for example, are the conventional polyaminoamides, these being polymers which are prepared, for example, by condensation of polyamines as described above, as base polyamine, and polycarboxylic acids, more particularly diacarboxylic acids.

The polyamines preferred for use in the context of the present invention, as crosslinking agents, have an active-H equivalent mass (mass of polyamine per mole of active hydrogen (N—H groups), i.e., hydrogen on primary and secondary amino groups) of 15 to 330 g of polyamine per mole of active hydrogen, with more particular preference of 35 to 330 g/mol, very preferably of 150 to 250 g/mol (measured by way of the determination of primary and secondary amine groups in accordance with ASTM D2073).

Such polyamines or polyamine adducts or else polyaminoamides as reactants and/or crosslinking agents of epoxy resins may be obtained, for example, under the trade name Beckopox from the company Cytec or else under the trade name Cardolite (Cardolite NC-562, for example) from the company Cardolite.

Very particular preference is given in the context of the present invention to using at least one epoxy resin as organic resin (A) in combination with at least one polyamine as crosslinking agent.

The fraction of these polyamines as a proportion of the anticorrosion primer is preferably selected such that the ratio of the complementary reactive functional groups of the at least one polyamine (i.e., of crosslinkable N—H groups from primary and secondary amino groups, therefore) to the epoxide groups of the at least one epoxy resin (A) is between 0.4 and 1.4, more preferably between 0.6 and 1.0, very preferably between 0.7 and 0.9 (for determination of epoxide group content and active-H equivalent mass, see above).

The anticorrosion primer of the invention further comprises at least one synthetic layered double hydroxide (B) containing organic anions. Each LDH contains at least one kind of organic anions of the following formula (I):

where
$R_1=COO^-$, $SO_3^-$;
$R_2/R_3=NH_2$, OH, H.

It is preferred in accordance with the invention if $R_2=R_3=H$ is excluded. Accordingly, therefore, particularly preferred combinations of $R_1/R_2/R_3$ are $COO^-/NH_2/NH_2$, $COO^-/NH_2/OH$, $COO^-/NH_2/H$, $COO^-/OH/NH_2$, $COO^-/OH/OH$, $COC^-/OH/H$, $COC^-/H/NH_2$, $COC^-/H/OH$, $SO_3^-/NH_2/NH_2$, $SO_3^-/NH_2/OH$, $SO_3^-/NH_2/H$, $SO_3^-/OH/NH_2$, $SO_3^-/OH/OH$, $SO_3^-/OH/H$, $SO_3^-/H/NH_2$, $SO_3^-/H/OH$. The organic anions on which these combinations are based lead to especially good corrosion resistance of the anticorrosion primers. Among the anions of the formula (I), more particular preference is given to the anilinesulfonates encompassed by the formula, namely to p-anilinesulfonate and m-anilinesulfonate, and also to 3,4-dihydroxybenzoate. Especially preferred is m-anilinesulfonate. In a further embodiment of the invention, 3,4-dihydroxybenzoate is used with very particular preference.

The organic anions of the formula (I) are therefore obtainable more particularly by deprotonation of the carboxy group or sulfonic acid group of the corresponding acids. In the context of the present invention, such deprotonation takes place preferably by an increase in the pH of an aqueous solution or suspension of the respective compound. The deprotonation is carried out more particularly as part of the preparation of the LDH (B), which is indicated later on below.

The compounds of the formula (I) and/or the respective corresponding acids may also contain amino groups. These amino groups, as is known, may give a basic reaction, i.e., may react as proton acceptors, and so bring about a cationic character. As a result of the carboxy group or sulfonic acid group that is present in each case, and of any amino group or groups that may be present, it is also possible, depending on pH, for example, for a zwitterionic character to result. In this context as well, therefore, an increase in pH may be necessary in order to convert the respective acids fully into anions of the formula (I). In this context, however, it must be borne in mind that the base strength of the amino group or groups is lowered by the phenyl parent structure and by the associated delocalization of the free electron pair on the nitrogen of the amino group or groups in comparison to aliphatic amines. Reference may be made, for example, to the $pK_b$ values of pure aniline (9.4) and aminoethane (3.4). This means that any amino groups present are already fully deprotonated in the neutral or weakly alkaline range and hence that a purely anionic molecular character may be brought about.

LDH can be described by the following general formula (II):

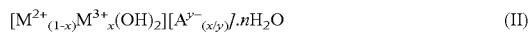

where $M^{2+}$ stands for divalent metallic cations, $M^{3+}$ for trivalent metallic cations and $A^{y-}$ for anions of average valence y. By average valence is meant, in the context of the present invention, the average value of the valence of the possibly different intercalated anions. As the skilled person readily appreciates, different anions, which are different in their valence (for example, carbonate, nitrate, anion obtainable from EDTA, etc.), depending on their respective proportion among the total amount of anions (weighting factor), may contribute to an individual average valence in each case. For x, values from 0.05 to 0.5 are known, while the fraction of water of crystallization, with values of n=0 to 10, may be very different. The divalent and trivalent metal cations and also hydroxide ions are present in a regular arrangement of edge-linked octahedra in the positively charged metal hydroxide layers (first bracketed expression in formula (II)) and the intercalated anions are present in the respective negatively charged interlayers (second bracketed expression in formula (II)), and water of crystallization may be present additionally.

The LDH to be used with advantage in the context of the present invention are described by the formula (II):

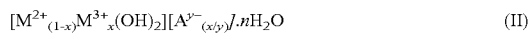

where
the divalent metallic cations $M^{2+}$ are selected from the group consisting of $Zn^{2+}$, $Mg^{2+}$, $Ca^{2+}$, $Cu^{2+}$, $Ni^{2+}$, $Co^{2+}$, $Fe^{2+}$, $Mn^{2+}$, $Cd^{2+}$, $Pb^{2+}$, $Sr^{2+}$ and mixtures thereof, preferably $Zn^{2+}$, $Mg^{2+}$, $Ca^{2+}$ and mixtures thereof, very preferably $Zn^{2+}$ and/or $Mg^{2+}$, more particularly $Zn^{2+}$, the trivalent metallic cations $M^{3+}$ are selected from the group consisting of $Al^{3+}$, $Bi^{3+}$, $Fe^{3+}$, $Cr^{3+}$, $Ga^{3+}$, $Ni^{3+}$, $Co^{3+}$, $Mn^{3+}$, $V^{3+}$, $Ce^{3+}$, $La^{3+}$ and mixtures thereof, preferably $Al^{3+}$, $Bi^{3+}$ and/or $Fe^{3+}$, more particularly $Al^{3+}$,
the anions $A^{y-}$ at least proportionally comprise at least one organic anion of the following formula (I):

where
$R_1=COO^-$, $SO_3^-$,
$R_2/R_3=NH_2$, OH, H, and more particularly $R_2=R_3=H$ is excluded,
x adopts a value of 0.05 to 0.5, more particularly 0.15 to 0.4, very preferably of 0.25 to 0.35, and
n adopts a value of 0 to 10.

The preparation of LDH may take place in accordance with methods known per se, as are described in E. Kanezaki, Preparation of Layered Double Hydroxides, in Interface Science and Technology, Vol. 1, Chapter 12, page 345 ff.—Elsevier, 2004, ISBN 0-12-088439-9. Further information on the synthesis of LDH is described in, for example, D. G. Evans et al., "Preparation of Layered Double Hydroxides", Struct Bond (2006) 119, pages 89-119 [DOI 10.1007/430_006, Springer Berlin Heidelberg 2005].

In principle the preparation of LDH from mixtures of inorganic salts of the metallic cations may take place with observance of the required and/or desired ratios (stoichiometries) of divalent and trivalent metallic cations in aqueous phase at defined basic pH levels which are kept constant. Where the synthesis takes place in the presence of carbon dioxide, as for example under atmospheric conditions and/or as a result of addition of carbonates, the LDH generally contain carbonate as intercalated anion. The reason for this is that the carbonate has a high affinity for intercalation into the layer structure of the LDH. If operation takes place with exclusion of carbon dioxide and carbonates (for example, nitrogen or argon inert gas atmosphere, non-carbonate-containing salts), the LDH contain the inorganic anions of the metal salts, chloride ions for example, as intercalatated anions.

The synthesis may also be carried out with exclusion of carbon dioxide (inert gas atmosphere) and/or carbonate and in the presence of, for example, organic anions or their acidic precursors which are not present as anion in the metal salts. In this case the product is generally a mixed hydroxide which has the corresponding organic anions intercalated.

As a result of the method specified above, referred to as the direct coprecipitation method, therefore, the desired LDH are obtained in a one-step synthesis.

In the context of the present invention it has emerged that the use of the direct coprecipitation method is considered to be particularly advantageous. It is advantageous here if, under an inert gas atmosphere, the metal salts are added dropwise to an initial charge of an aqueous, basic solution of the organic anions of the formula (I) that are to be intercalated in accordance with the invention, with the pH kept constant during this dropwise addition by controlled addition of a base, such as sodium hydroxide solution, for example. In order to achieve a controlled and effective crystallization, the metal salt solutions are advantageously added dropwise slowly—that is, depending on concentrations and amounts of the solutions to be introduced as initial charge and to be added dropwise, over the course of around 1 to 10 hours, more particularly 2 to 5 hours. Complete dropwise addition is then followed advantageously by aging, or further stirring, of the suspension for a period of from around 1 hour to 10 days, more particularly between 2 and 24 hours, in order to ensure very complete conversion. The LDH are then obtained, following centrifugation and repeated washing with water, in the form of a slurry, and can be used as such in water-based anticorrosion primers. After corresponding drying at temperatures between, for example, between 20° C. and 40° C., the LDH are obtained in powder form and can then be used in solvent-based anticorrosion primers.

In the context of the present invention it is advantageous to select the amount of trivalent metal cations metered in such as to result in an organic anion/$M^{3+}$ ratio of between 1:1 to 10:1, with more particular advantage between 1:1 and 5:1.

The pH during preparation of the LDH is selected advantageously at between 7 and 12 and is kept constant during the entire synthesis. An optimum pH generally arises in accordance with the desired composition (for example choice of the metallic cations $M^{2+}/M^{3+}$ and/or organic anions, and/or of the respective starting materials for generating these components), and can easily be adapted by the skilled person. Reference may be made, for example, to the basicity of the respective organic anion and/or the acidity of the corresponding acid. For the especially preferred LHD comprising $Zn^{2+}$ and $Al^{3+}$ as metallic cations and m-anilinesulfonate as organic anion, the pH to be selected is more particularly between 8 and 11, very preferably between 8.5 and 9.5, and must of course likewise be kept constant throughout the synthesis.

Likewise used with advantage in the context of the present invention is the method referred to as the anionic exchange reaction method. In this case the property of the LDH of being able to exchange intercalated anions is exploited. The layer structure of the cationic mixed metal hydroxide layers of the LDH is retained. To start with, LDH already prepared, as for example LDH prepared by the coprecipitation method under an inert gas atmosphere, containing readily exchangeable anions such as chloride or nitrate in comparison to the carbonate, are suspended in aqueous alkaline solution under an inert gas atmosphere. This suspension or slurry is subsequently added under inert gas atmosphere to an aqueous alkaline solution of the organic anions of the formula (I) that are to be intercalated, followed by stirring for a certain time—for example, 1 hour to 10 days, more particularly 1 to 5 days. The LDH are then again obtained in the form of a slurry, after centrifugation and repeated washing with water, and can be used as such in water-based anticorrosion primers. After corresponding drying at temperatures between, for example, between 20° C. and 40° C., the LDH are obtained in powder form and can then be used in solvent-based anticorrosion primers.

In the context of the anionic exchange reaction method as well it is of advantage to select the amount of anions to be intercalated such that the organic anion/$M^{3+}$ ratio is between 1:1 to 10:1, with more particular advantage between 1:1 and 5:1.

The pH of the ion exchanger solution is again advantageously between 7 and 12, in accordance, for example, with the acidity of the conjugated acid of the anion and of the stability of the initial LDH phase. For the especially preferred LDH comprising $Zn^{2+}$ and $Al^{3+}$ as metallic cations and m-anilinesulfonate as organic anion, the pH in the case of the exchange reaction method as well is to be selected more particularly at between 8 and 11, very preferably between 8.5 and 9.5, and is of course likewise to be kept constant throughout the synthesis.

All of the reaction steps specified above take place—unless otherwise indicated—advantageously at between 10° C. and 80° C., more particularly at room temperature, in other words between about 15 and 25° C., in the context of the present invention.

Likewise possible is the synthesis of LDH containing organic anions by the method known as the reconstruction method. In the case of this method, for example, existing LDH are heated in powder form for a number of hours to several hundred degrees Celsius (for example, 3 hours at 450° C.). The LDH structure collapses, and volatile and/or thermally decomposable intercalated anions, and also the water of crystallization, are able to escape. As a result of the extreme treatment, for example, the carbonate decomposes, and carbon dioxide and water escape. What is left behind is an amorphous mixture of metal oxides. By adding aqueous solutions of the anions to be intercalated, under an inert gas atmosphere, the LDH structure is re-established, and the desired LDH are produced. This method is employed more particularly when using commercially acquired LDH which, as a result of their synthesis and storage, frequently comprise the high-affinity, well-intercalating carbonate.

It is of advantage in the context of the present invention, however, to prepare the LDH by the direct coprecipitation method and/or by the anionic exchange reaction method, very preferably by the direct coprecipitation method. This is done using, more particularly, nitrate salts and/or chloride salts of the respective metal cations. In comparison to the carbonate, these inorganic anions have good exchange qualities and therefore allow the preparation of LDH with a high fraction of the desired organic anions. In particular there is no need, as with the reconstruction method, for an extreme thermal treatment to take place in order thereby to expel the carbonate with LDH affinity. A further factor is that, in the case of the methods preferred in accordance with the invention, controlled formation of the LDH structure is made possible through slow and controllable addition of the metal salt solutions (direct coprecipitation method), or the LDH structure is retained during the synthesis (anionic exchange reaction method). None of these advantages exists in the case of the reconstruction method, and so the LDH thus prepared exhibit frequent defect sites in their crystal structure, and the method leads to commensurate results only in the case of the $Mg^{2+}/Al^{3+}$ system, since only this system possesses the necessary capacity for thermodynamic self-reorganization under the prevailing conditions.

The LDH prepared in the context of the present invention may comprise certain amounts of inorganic anions, such as carbonate, chloride and/or hydroxide ions, for example, as a result of their synthesis and storage, in addition to the organic anions of the formula (I). The organic anions of the formula (I), however, are preferably present in a fraction such that more than 60% of the positive layer charge of the metal hydroxide layers, generated through the trivalent metal cations, is compensated by these anions (degree of charge compensation of more than 60%). With very particular preference the degree of charge compensation is more than 70%, more particularly more than 80%. The degree of charge compensation is determined in the context of the present invention by means of quantitative element analysis techniques or quantitative elementary analysis techniques that are familiar per se to the skilled person. For instance, the metal atoms in the LDH layers and also heavier heteroatoms such as, in particular, sulfur (phosphorus is also possible), can be determined quantitatively by way of element analysis by means of ICP-OES (inductively coupled plasma optical emission spectroscopy), whereas for LDH samples whose organic anions comprise only the elements C/N/N/O, a quantitative determination of the amount of these anions is made possible by elemental analysis. For the ICP-OES, an LDH sample prepared as described above, after washing and drying, is admixed with an inorganic acid, nitric acid for example, and thereby broken down, whereas the elemental analysis is carried out in accordance with the well-known combustion method with subsequent gas-chromatographic separation and quantitative determination (WLD) of the oxidation products and reduction products, respectively. From the amounts of the metal atoms and of the heavier heteroatoms (more particularly sulfur) determined by element analysis in the organic anions (that is, a specific heavy heteroatom bound in the anion, more particularly sulfur as in the case of the anilinesulfonates), the amounts of the trivalent metal cations, more particularly the $Al^{3+}$, and of the respective organic anion are determined, and the ratio of these amounts is used, with account taken of the corresponding atomic weights or molecular weights, to ascertain the degree of charge compensation. The theoretical maximum value of 100% corresponds in this case to an equivalents ratio of positive charge equivalent of the trivalent metal cation to negative charge equivalent of the organic anion of the formula (I) of one.

In the case of LDH phases whose organic anions contain no specific heteroatoms that can be determined via ICP-OES, the amounts of the atoms C, H, N and O as determined by elemental analysis allow calculation of the amount of these anions in the LDH sample, with account taken of the known empirical formula of the respective organic anion and of the amount of physisorbed water (determined from the weight loss to 150° C. in a thermal weight loss analysis, TGA).

The preferred degrees of charge compensation of the organic anions in question can be achieved in particular through the use of the preferred preparation methods, namely the direct coprecipitation method and the anionic exchange reaction method, under the preferred conditions described above (for example, pH or ratio of organic anion to trivalent metal cation).

The hydrotalcite component (B) is used preferably in a fraction of 0.1% to 30% by weight, with more particular preference of 1% to 20% by weight, very preferably of 5% to 15% by weight, and more particularly at 7.5% to 12.5% by weight, based in each case on the total amount of the anticorrosion primer for use in accordance with the invention.

The anticorrosion primer for use in accordance with the invention generally further comprises at least one organic solvent and/or water. Organic solvents are used which do not inhibit the crosslinking of the anticorrosion primers of the invention and/or do not enter into chemical reactions with the other constituents of the anticorrosion primers of the invention. The skilled person is therefore able to select suitable solvents easily on the basis of their known solvency and their reactivity. Examples of such solvents are aliphatic and/or aromatic hydrocarbons such as toluene, xylene, solvent naphtha, Solvesso 100, or Hydrosol® (from ARAL), ketones, such as acetone, methyl ethyl ketone or methyl amyl ketone, esters, such as ethyl acetate, butyl acetate, butylglycol acetate, pentyl acetate or ethyl ethoxypropionate, ethers, alcohols, chlorinated hydrocarbons or mixtures of the aforesaid solvents.

The anticorrosion primer for use in accordance with the invention may further comprise at least one additive. Examples of such additives are salts which can be decomposed thermally without residue or substantially without residue, reactive diluents, pigments, fillers, molecularly dispersely soluble dyes, nanoparticles, light stabilizers, antioxidants, deaerating agents, emulsifiers, slip additives, polymerization inhibitors, initiators for radical polymerizations, adhesion promoters, flow control agents, film-forming assistants, thickeners, sag control agents (SCAs), flame retardants, corrosion inhibitors, waxes, biocides and matting agents. They are used in the customary and known amounts.

The solids content of the anticorrosion primer for use in accordance with the invention may be varied according to the requirements of the individual case. The solids content is guided primarily by the viscosity required for the application, and so may be adjusted by the skilled person on the basis of his or her general art knowledge, optionally with the assistance of a few rangefinding tests.

The solids of the anticorrosion primer is preferably 20% to 90% by weight, more preferably 30% to 80% by weight, and with more particular preference 40% to 60% by weight.

The anticorrosion primer for use in accordance with the invention may be produced using the mixing assemblies and mixing methods that are customary and known for the production of coating materials.

In the context of the method of the invention, the anticorrosion primer to be used in accordance with the invention is applied directly to a metallic substrate. Applied directly means that before the anticorrosion primer is applied, no other coating material capable of forming an organic-polymeric matrix, or a conversion coating material, is applied. The anticorrosion primer, therefore, is the first applied coating material.

Application of the anticorrosion primer for use in accordance with the invention to a metallic substrate may take place in the film thicknesses (wet-film layer thicknesses) that are customary in the context of the vehicle industry and aviation industry, in the range of, for example, 5 to 400 μm, preferably 10 to 200 μm, more preferably 15 to 100 μm. This is done using, for example, the known techniques such as spraying, knife coating, spreading, pouring, dipping, impregnating, trickling or rolling. Preference is given to employing spraying or knife coating techniques.

After the anticorrosion primer for use in accordance with the invention has been applied, a polymer film is formed from it. That is, the applied anticorrosion primer is cured by known techniques. Preference is given to physical or thermal curing, since physically and thermally curing systems are preferred in the context of the present invention. Especially preferred is the thermal curing of externally crosslinking 2C systems.

The physical curing takes place at temperatures of preferably 5 to 160° C., more particularly of 10 to 100° C. and very preferably at 20° C. to 60° C. The time period required in this case is heavily dependent on the coating system used and on the curing temperature. Among the physically curable anticorrosion primers, preference is given to those which at the temperatures stated produce a tack-free coating, which is therefore recoatable, within two hours.

The thermal curing takes place preferably at temperatures of 10 to 200° C., more particularly 10 to 100° C., very preferably of 10 to 50° C. These preferred, fairly low, curing temperatures are a result of the fact that only low curing temperatures are known to be necessary for the preferred two-component systems, more particularly an epoxy resin/polyamine system. The time period of thermal curing may vary greatly according to the particular case, and is for example between 5 minutes and 5 days, more particularly between 1 hour and 2 days.

Preceding curing, depending on the individual case and binder/crosslinking agent systems used, may be a flash at, for example, at room temperature (about 15 and 25° C.) for 1 to 60 minutes, for example, and/or drying at, for example, slightly elevated temperatures of 30 to 80° C. for 1 to 60 minutes, for example. Flash and drying in the context of the present invention mean evaporation of organic solvents and/or water, making the coating material dry but not yet cured or having not yet formed a fully crosslinked film.

Curing then produces the coated metal substrate of the invention, which is likewise provided by the present invention.

After the anticorrosion material has cured, further, customary and known coating materials, capable of forming a coating layer based on a polymeric matrix, may be applied by customary and known techniques. The associated film thicknesses (wet-film layer thicknesses) of the respective individual coats are within the usual ranges, as for example between 5 to 400 μm, more particularly between 20 and 200 μm. Application is then followed by the curing of the coatings in accordance with the techniques which are likewise known and customary. The individual coatings may also be produced by applying them successively without complete curing of the individual coats each time, and then curing them in a final, joint curing procedure (wet-on-wet method). It is of course also possible to cure the individual coats fully in each case.

In the context of the automotive industry, the further coats may, as is known, be customary surfacer coats, basecoats and clearcoats. In the context of the aviation industry, they may constitute the typical single-coat topcoat finishes, based for example on (2C) polyurethane systems.

Any further coating materials may of course also be applied before the full curing of the anticorrosion material. This means that the anticorrosion material is merely flashed and/or dried beforehand (wet-on-wet method).

Metallic substrates contemplated include ultimately all metallic substrates which are employed, for example, in the context of the metal industry (for example, mechanical engineering and equipment, automotive industry (vehicle construction), aviation and aerospace industry, shipbuilding industry, electrical industry, precision mechanics industry). It is advantageous to use aluminum, aluminum alloys such as, more particularly, aluminum-copper alloys, very preferably the AA2024-T3 alloy, and also unalloyed and alloyed steel.

The invention is illustrated below with reference to examples.

EXAMPLES

A) Preparation of LDH

Different LDH based on zinc-aluminum were prepared via the direct coprecipitation method. The LDH for use in accordance with the invention were obtained using m-anilinesulfonic acid and 3,4-dihydroxybenzoic acid. For comparison, the known ethylenediamine tetraacetate obtainable from ethylenediaminetetraacetic acid (EDTA) was used (cf., for example, ECS Transactions, 24 (1) 67-76 (2010)). The precise preparation is set out for m-anilinesulfonic acid (m-anilinesulfonate) by reference to the protocol below.

A 0.21 molar aqueous alkaline solution (pH=9) of m-anilinesulfonic acid (m-anilinesulfonate) is admixed at a constant metering rate over 3 hours with an aqueous mixture of $ZnCl_2.6H_2O$ (0.52 molar) and $AlCl_3.6H_2O$ (0.26 molar) at room temperature under a nitrogen atmosphere and with continuous stirring, the amount of cations added being selected such as to result in a molar ratio of the anilinesulfonate to the trivalent Al cation of 2:1. The pH is kept constant at 9 by addition of a 3-molar NaOH solution. Following addition of the aqueous mixture of the metal salts, the resulting suspension is stirred, and aged, at room temperature for 3 hours. The resulting precipitate is isolated by centrifuging and washed 4 times with deionized water. The resulting slurry of the white reaction product is dried under reduced pressure at 30° C. for 24 hours and then obtained as a white powder. The LDH (theoretical empirical formula in the case of a theoretical maximum value of the degree of charge compensation of 100% by the m-anilinesulfonate: $Zn_2Al(OH)_6$(m-anilinesulfonate)) have a degree of charge compensation of 84% (measured by quantitative element analysis via ICP-OES).

While the synthesis of the LDH containing 3,4-dihydroxybenzoate was carried out in analogy to the synthesis of the LDH containing m-anilinesulfonate, a pH of 10.5 was selected for the LDH containing EDTA, in order to ensure complete deprotonation of the organic species. It was found, moreover, that a molar ratio of the ethylenediaminetetraacetate to the trivalent Al cation of 5:1 gave the best results (the amounts, determined by elemental analysis, of C(8.4%), N(1.9%) and H(3.6%) correspond largely to the calculated values of 8.2%, 1.9% and 3.5% for the theoretical composition $Zn_2Al(OH)_6[EDTA]_{0.25}.2H_2O$).

B) Production of Anticorrosion Primers

Anticorrosion primers comprising LDH-(A) (m-anilinesulfonate) and LDH-(B) (3,4-dihydroxybenzoate) and also LDH-(comparative) (EDTA) were produced. The fraction of LDH was in each case 10% by weight, based on the overall composition, and was incorporated into the polymer component (cf. Table 1) before the coating material was made up. Likewise produced was a reference coating material for the determination of the corrosion resistance, as set out under D). In this reference coating material, no LDH was used. The anticorrosion primer was an epoxy resin/polyamine-based (2C) coating material. The constituents and the amounts thereof of the polymer component and of the crosslinking component of the anticorrosion primer are reported in Tables 1 and 2. The components were mixed in a ratio of 3:1 (polymer component:crosslinking component) immediately prior to application to a substrate.

TABLE 1

Composition of polymer component

| Constituent | Amount |
|---|---|
| Epikote 834-x-80[1] | 52.2 |
| Beckopox EM 460/60IBX[2] | 13.2 |
| Commercially customary wetting and dispersing additive | 1.2 |
| Xylene | 7.8 |

TABLE 1-continued

Composition of polymer component

| Constituent | Amount |
|---|---|
| Methoxypropyl acetate | 15.5 |
| Butyl acetate | 10.0 |

[1] Commercially customary epoxy resin from Momentive, epoxide group content (based on solid resin) = 4000 mmol/kg, solids = 80% in xylene;
[2] Commercially customary epoxy resin from Cytec, solids = 60% in xylene.

TABLE 2

Composition of crosslinking component

| Constituent | Amount |
|---|---|
| Cardolite NC 562[1] | 49.6 |
| Merginamid L 190[2] | 9.2 |
| Ancamine K54[3] | 0.4 |
| Methoxypropanol | 12.7 |
| Isobutanol | 8.0 |
| Xylene | 15.7 |
| Diethylentriamine | 1.2 |
| Epikote 828[4] | 3.2 |

[1] Commercially customary epoxy resin crosslinking agent (polyamine) from Cardolite, active-H equivalent mass 174 g/mol, solids 65%,
[2] Commercially customary epoxy resin crosslinking agent (polyamine or polyaminoamide), active-H equivalent mass 230 g/mol,
[3] Commercially customary designation for tris(dimethylaminomethyl)phenol, usual activator for epoxy resin crosslinking agents (polyamines),
[4] Commercially customary epoxy resin without solvent, from Momentive, epoxide group content 5300 mmol/kg.

C) Production of Coated Substrates

Substrate panels made from the AA2024-T3 alloy (aluminum-copper alloy) were coated with the prepared anticorrosion primers.

For this purpose the substrate panels were first cleaned with isopropanol and dried in a drying oven at 60° C. The panels were then etched for 3 minutes by immersion in 4-molar NaOH solution, after which they were washed with water. This was followed by immersion of the panels for 2 minutes in a mixture of water/nitric acid (70% strength) (2:1, (v/v)), further rinsing with water, and a final drying of the panels at 60° C. in a drying oven.

The anticorrosion primers comprising LDH-(A), LDH-(B), LDH-(comparative), and also the reference coating material were applied to the thus-prepared substrate panels, in each case using a 50 μm wire doctor, and the coated panels were then cured at 25° C. for 24 hours. A conventional two-component polyurethane topcoat material was then applied, using a 175 μm wire doctor, followed by curing at 25° C. for 24 hours. The coated metal substrates thus produced were stored at 25° C. for 7 days and subsequently investigated as described under D).

D) Testing of the Corrosion Resistance of the Coated Metal Substrates

The testing of the corrosion resistance or of the corrosion inhibition efficiency of the coated metallic substrates took place by means of direct-current polarization measurements (DC polarization). As is known, the basis of a process of corrosion is an electrochemical reaction between a material, generally a metal surface, and its environment, with the metal oxidizing and, correspondingly, metal cations emerging from the solid material—in other words, a corrosion current flows. DC polarization measurement is an electrochemical measurement technique which is known per se, and is described in Progress in Organic Coatings, 61 (2008) 283-290, for example. The method measures the current response of a system to a variation in potential, with a constant scan rate. The corrosion current can then be derived from the resulting measurement data.

The corrosion inhibition efficiency I.E. is determined on the basis of the formula $$I.E. (\%) = ((i_0 - i_{LDH})/(i_0)) \cdot 100\%$$

wherein the parameters relate to the corrosion current or corrosion current density (units, for example, amperes per square centimeter) of the reference sample ($i_0$, substrate coated with reference coating material (without LDH)) or of the respective LDH sample ($i_{LDH}$, substrate coated with the anticorrosion primers comprising LDH-(A), LDH-(B) or LDH-(comparative)). The parameter I.E. (%), accordingly, is corrected in each case for the corrosion resistance of the reference coating system; the figure reported is the improvement in corrosion resistance or in corrosion inhibition efficiency in relation to the reference sample.

The lower the corrosion current density, the more effectively the substrate is shielded or protected from corrosion. This means that, with low values for $i_{LDH}$ and with a correspondingly good corrosion inhibition efficiency, the parameter I.E. adopts a high value. For the reference sample (for which, by definition, $i_0$ must=$i_{LDH}$), the parameter I.E. adopts, by definition, a value of 0%.

The measurements were carried out using a VSP Multichannel Potentiostat/Galvanostat from BioLogic, using the corresponding user software EC-Lab V9.95, which likewise comes from BioLogic. The electrolyte solution used for the measurements was a 0.5 M NaCl solution; all measurements were carried out at 25° C. The electrode used, besides the metal of the respective coated metallic substrate, was a calomel electrode (as counter-electrode). Immediately prior to the measurement, the coated metallic substrates were scored with a blade (1 mm cutting width). In this scoring, first two parallel cuts with a length of 2 cm were made and then additionally two parallel cuts were made in cross formation relative to the first two cuts. The surface area exposed to the electrolyte, accordingly, is approximately 1.6+/−0.2 cm².

Table 3 shows the corresponding results of measurement, as average values, for the systems investigated.

TABLE 3

| LDH anion of the anticorrosion primer | I.E. (%) |
|---|---|
| (A) m-Anilinesulfonate | 32.7 |
| (B) 3,4-Dihydroxybenzoate | 31.5 |
| (Comparative) EDTA | 10.0 |

The data demonstrate that the corrosion inhibition efficiency of the anticorrosion coatings produced by the method of the invention or of the coated metallic substrates of the invention is improved significantly in comparison to non-LDH-containing coatings (I.E.=0). Moreover, a corrosion inhibition efficiency is obtained which is improved by a factor of around 3 by comparison with that of a coating system which comprises the known EDTA-LDH.

The invention claimed is:
1. A method for producing an anticorrosion coating, comprising:
   (1) applying directly to a metallic substrate: an anticorrosion primer comprising:
      (A) at least one organic polymer that is free from carboxylate groups and carboxylic acid groups as a binder and
      (B) at least one synthetic layered double hydroxide comprising organic anions and
   (2) forming a polymer film from the anticorrosion primer applied in stage (1),
   the method being characterized in that
   the at least one synthetic layered double hydroxide (B) comprises at least one organic anion of the following formula (I):

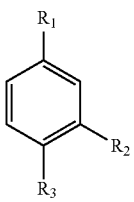

(I)

where
$R_1$=COO$^-$, SO$_3^-$,
$R_2$/$R_3$=NH$_2$, OH, H.

2. The method according to claim 1, wherein the anticorrosion primer comprises at least one polyvinylbutyral resin and/or epoxy resin as organic polymer (A).

3. The method according to claim 2, wherein the anticorrosion primer comprises at least one epoxy resin as organic polymer (A) and at least one polyamine as crosslinking agent.

4. The method according to claim 1, wherein the anticorrosion primer is a two-component system.

5. The method according to claim 1, wherein the formula (I) $R_2$=$R_3$=H is excluded.

6. The method according to claim 1, wherein the at least one synthetic layered double hydroxide (B) comprising organic anions has the general formula (II)

$$[M^{2+}_{(1-x)}M^{3+}_x(OH)_2][A^{y-}_{(x/y)}]\cdot nH_2O \quad (II)$$

where $M^{2+}$ stands for divalent metallic cations, $M^{3+}$ stands for trivalent metallic cations and $A^{y-}$ stands for anions of average valence y, the anions at least proportionally comprising at least one organic anion which is obtainable from a compound of the formula (I), x adopts a value of 0.05 to 0.5 and n adopts a value between 0 and 10.

7. The method according to claim 6, wherein
the divalent metallic cations $M^{2+}$ are selected from the group consisting of $Zn^{2+}$, $Mg^{2+}$, $Ca^{2+}$, $Cu^{2+}$, $Ni^{2+}$, $Co^{2+}$, $Fe^{2+}$, $Mn^{2+}$, $Cd^{2+}$, $Pb^{2+}$, $Sr^{2+}$, and mixtures thereof,
the trivalent metallic cations $M^{3+}$ are selected from the group consisting of $Al^{3+}$, $Bi^{3+}$, $Fe^{3+}$, $Cr^{3+}$, $Ga^{3+}$, $Ni^{3+}$, $Co^{3+}$, $Mn^{3+}$, $V^{3+}$, $Ce^{3+}$, $La^{3+}$, and mixtures thereof,
x is a value of 0.05 to 0.5, and
n is a value of 0 to 10.

8. The method according to claim 1, wherein the at least one compound of the formula (I) is selected from the group consisting of 3,4-dihydroxybenzoic acid and also aniline-sulfonic acids encompassed by the formula (I).

9. The method according to claim 8, wherein m-aniline-sulfonic acid is selected as compound of the formula (I).

10. The method according to claim 1, wherein the at least one synthetic layered double hydroxide (B) comprising organic anions is prepared by direct coprecipitation or anionic exchange reaction.

11. The method according to claim 1, wherein the fraction of the at least one synthetic layered double hydroxide (B) comprising organic anions is 5% to 15% by weight, based on the total amount of the anticorrosion primer.

12. The method of claim 1, further comprising, after the formation of the polymer film (2),
   (3) applying at least one further coating material to produce a multicoat coating.

13. The method according to claim 1, wherein the metallic substrate is selected from the group consisting of aluminum, aluminum alloys.

14. The method of claim 1, wherein the anticorrosion primer is effective for improving the corrosion resistance of the metallic substrate.

15. A coated metallic substrate coated by the method according to claim 1.

* * * * *